(12) United States Patent
Alvarez, Jr. et al.

(10) Patent No.: US 7,824,628 B2
(45) Date of Patent: Nov. 2, 2010

(54) SELF-REGENERATIVE PROCESS FOR CONTAMINANT REMOVAL FROM AMMONIA

(75) Inventors: Daniel Alvarez, Jr., San Diego, CA (US); Jeffrey J. Spiegelman, San Diego, CA (US)

(73) Assignee: Entegris, Inc., Billerica, MA (US)

( * ) Notice: Subject to any disclaimer, the term of this patent is extended or adjusted under 35 U.S.C. 154(b) by 1322 days.

(21) Appl. No.: 10/141,215

(22) Filed: May 7, 2002

(65) Prior Publication Data

US 2002/0128148 A1    Sep. 12, 2002

Related U.S. Application Data

(62) Division of application No. 09/699,100, filed on Oct. 27, 2000, now Pat. No. 6,524,544.

(51) Int. Cl.
*B01D 50/00*    (2006.01)
(52) U.S. Cl. ..................................... 422/171
(58) Field of Classification Search ............... 423/237, 423/171, 173, 210, 245.1; 95/115, 122, 138; 422/171, 173, 177
See application file for complete search history.

(56) References Cited

U.S. PATENT DOCUMENTS

| | | | |
|---|---|---|---|
| 3,361,531 A * | 1/1968 | Erb et al. ................... | 423/219 |
| 3,616,334 A | 10/1971 | Aker et al. | |
| 4,045,315 A | 8/1977 | Ryason et al. | |
| 4,427,504 A | 1/1984 | Stucki | |
| 4,976,944 A | 12/1990 | Pacaud et al. | |
| 5,055,282 A * | 10/1991 | Shikada et al. ............. | 423/351 |
| 5,496,778 A | 3/1996 | Hoffman et al. | |
| 5,607,572 A * | 3/1997 | Joshi ......................... | 95/138 |
| 5,632,964 A * | 5/1997 | Ishii et al. ................... | 423/210 |
| 5,660,809 A | 8/1997 | Costa et al. | |
| 5,679,313 A * | 10/1997 | Nojima et al. .............. | 423/351 |
| 5,716,588 A | 2/1998 | Vergani et al. | |
| 5,833,738 A * | 11/1998 | Carrea et al. ............... | 95/115 |
| 5,855,862 A | 1/1999 | Grenier et al. | |
| 5,976,723 A * | 11/1999 | Boffito et al. .............. | 423/351 |
| 6,241,955 B1 * | 6/2001 | Alvarez, Jr. ................. | 95/138 |
| 6,331,281 B1 * | 12/2001 | Teru et al. ................... | 423/237 |

(Continued)

FOREIGN PATENT DOCUMENTS

EP    0 784595 B1    5/1998

(Continued)

*Primary Examiner*—Tom Duong
(74) *Attorney, Agent, or Firm*—Hamilton, Brook, Smith & Reynolds, P.C.

(57) ABSTRACT

A method and apparatus for the decontamination of fluid ammonia are described. Liquid or gaseous ammonia is purified of contaminants by passage through an adsorbent bed, the contaminants accumulating in the bed. A portion of the purified ammonia discharged from the bed is decomposed to hydrogen and nitrogen. The hydrogen is used to regenerate an adsorbent bed which has accumulated sufficient contaminants to reduce its ability to further decontaminate incoming ammonia satisfactorily. Preferably there are a plurality of interconnected adsorbent beds, with some being operated for ammonia decontamination while others are being regenerated, with their operations being reversed as needed to maintain a continual production of decontaminated ammonia from the plurality of beds. Computers or other controllers can be used to control such bed operations and interchanges. Internal production of hydrogen makes the system self-contained and no addition of hydrogen is needed.

23 Claims, 2 Drawing Sheets

U.S. PATENT DOCUMENTS

| | | |
|---|---|---|
| 6,524,544 B1 | 2/2003 | Alvarez, Jr. et al. |
| 2003/0094098 A1 | 5/2003 | Watanabe et al. |
| 2003/0205532 A1 | 11/2003 | Shrewsbury et al. |
| 2005/0019244 A1 | 1/2005 | Spiegelman et al. |

FOREIGN PATENT DOCUMENTS

| | | | |
|---|---|---|---|
| WO | WO 97/06104 | | 2/1997 |
| WO | WO 99/22848 | | 5/1999 |
| WO | WO 00/20330 | * | 4/2000 |

* cited by examiner

SELF-REGENERATIVE PROCESS FOR CONTAMINANT REMOVAL FROM AMMONIA

CROSS-REFERENCES TO RELATED APPLICATIONS

This application is a divisional application of U.S. patent application Ser. No. 09/699,100 filed Oct. 27, 2000 which is incorporated herein by reference in its entirety.

BACKGROUND OF THE INVENTION

1. Field of the Invention

The invention relates to the removal of contaminants from streams of ammonia gas and liquid. More particularly it relates to the production of substantially contaminant-free streams of ammonia gas or liquid for use in the production of semiconductors and similar products which cannot tolerate the presence of such contaminants during manufacture.

2. Background Art

There is current research to develop high performance light emitting diodes (LEDs). Such LEDs are intended for such disparate uses as in outdoor displays, vehicles, traffic signals, lasers, medical devices and indoor lighting, and are expected to replace the current bulbs or fluorescent lighting tubes. The high performance LEDs emit light of specific wavelengths compared to broad spectrum wavelength emissions of prior bulbs and tubes, so that optimal light spectra can be provided for each end use by combination of LEDs of different colors. For instance, LED combinations with spectra matching incandescent lighting (as compared to the spectra of flourescent lighting) can be provided for indoor use, without creating the heat generation and dispersion problems caused by incandescent bulbs.

These LEDs are made by metal organic chemical vapor deposition (MOCVD) using materials such as gallium-, aluminum gallium- and indium gallium nitrides and phosphides. In a process currently of significant interest, gallium nitride is deposited from a gaseous mixture of ammonia, hydrogen and trimethyl gallium. Similar, gallium nitride is being considered for "blue lasers," i.e. lasers which emit blue light. Because blue light has a shorter wavelength than red, yellow or green light, blue lasers are anticipated to be capable of forming compact disks which will have a much higher information density than is presently the case with compact disks produced with red laser light. Gallium nitride for such blue lasers would be manufactured in the same type of ammonia/hydrogen/trimethyl gallium gaseous environment as described above for the high capacity LEDs.

The LEDs, blue lasers and integrated circuits are all manufactured with electron accepting p-type dopants. Such products are extremely sensitive to the presence of electron-donating n-type materials, and very small concentrations of such n-type are sufficient to deactivate the p-type dopants and impair or destroy the performance and operability of the integrated circuits, LEDs and blue lasers. Oxygen is a particularly efficient n-type material, and the presence of molecular oxygen causes lattice defects and is detrimental to the desired band gap properties in the semiconductor or laser material. Even very low concentrations of oxygen (<100 ppb, usually <50 ppb, even <10 ppb) can be sufficient to cause reduction in performance or operability (especially in wavelength control) so as to require discarding of the product after manufacture or to significantly shorten operating lifetime. Similar detrimental effects are observed with similar low concentrations of water or hydrocarbons in the manufacturing system.

There are also numerous manufacturing processes of current interest in which ammonia is a major component in the production of high purity products. Commonly these processes use ammonia in gaseous form, but liquid ammonia is also used to some extent. In addition, a liquid ammonia component frequently is vaporized during a process to be used subsequently in gaseous form. A common requirement in these processes is that all reactants, catalysts, carriers, etc. must have the least practical contaminant level, since the products produced must be of very high purity. Examples include the following.

Recent advances in integrated circuit semiconductor technology have included the development of semiconductors with copper interconnects instead of aluminum interconnects. Copper interconnects are advantageous in that copper has less resistance than aluminum, which leads to higher performance in microprocessors, microcontrollers and random access memories. However, copper tends to migrate over a period of time, so it is necessary to construct barrier layers in the semiconductor to prevent the copper migration. Such boundary layers are typically made of nitrides such as tantalum nitride, titanium nitride or silicon nitride. These layers are commonly formed by deposition from a hydride gas, e.g., ammonia.

Ammonia is widely used as a source of nitrogen for film development in some thin film applications. The ammonia allows for lower temperature film growth in chemical vapor deposition (CVD) processes.

As mentioned, in addition to oxygen contamination, the presence of water vapor, gaseous hydrocarbons and/or carbon dioxide gas in hydride gases such as ammonia is also detrimental, since those materials lead to degradation of the products formed by deposition of active layers of metals or metal compounds from a hydride gas environment. Water is one of the most common and yet most difficult impurities to remove from the gases. Water is of course ubiquitous in almost all ambient environments. Even systems which are nominally referred to as "dry" usually have significant amounts of water, and most drying processes can reduce the moisture content of a gas only to a "minimum" which is still in the parts per million (ppm) range. However, since for many purposes water contents in the ppm range are quite acceptable, there are numerous patents and articles in the literature dealing with such types of "ppm drying processes."

In the manufacture of such products, moisture contents of the depositing gases which are in the ppm range are excessively wet. To form satisfactory products, the water content of the depositing gases must be reduced to the parts per billion (ppb) range, usually down to no more than about 100 ppb. See Whitlock et al, "High Purity Gases," in Ruthven, ed., ENCYCLOPEDIA OF SEPARATION TECHNOLOGY, vol. 1, pp. 987-1000 (1997).

Attempts to use materials such as reduced nickel or copper catalysts to remove contaminants such as oxygen, carbon dioxide and water from hydride gases have not been successful. While contaminant removal can be effected for short periods of time down to the 10 ppb level, the reactive effects of the hydride gases, especially ammonia, very quickly cause the materials to degrade and contaminate the gas stream with metal complexes. Though pre-existing impurities may be reduced, the introduction of new impurities to the manufacturing process is unacceptable.

Processes have been described in which oxygen has been removed from ammonia streams by metals serving as "getters." However, these have been relatively ineffective at reaching sufficiently low levels of decontamination. In addition, the getters are deposited on substrates, such as silica or zeolites, which do not play a central role in the decontamination process, and also may themselves be degraded by the hydride gases. See, for instance, U.S. Pat. Nos. 5,496,778 (Hoffman et al.), 5,716,588 (Vergani et al.) and 4,976,944 (Pacaud et al.); PCT publication No. WO 97/06104 (SAES Getters S.p.A.); and European Patent No. EP 0 784 595 B1 (SAES Getters S.p.A.). In particular, some of these references teach that manganese:iron ratios of >2:1 as depositions on such substrates are detrimental to getter performance and are to be avoided. The references specifically teach that very low manganese:iron ratios, usually about 0.012-0.16:1, are to be preferred. Further, the reference processes are usually not effective for removal of carbon dioxide or water, as compared to oxygen, from ammonia gas streams.

Consequently, the problem of removal of contaminant levels down to $\leqq 100$ ppb from ammonia remains a significant problem in the field of production of high purity LEDs, blue lasers, semiconductors, and the like. Those processes which are being used are expensive because of the very short service life of the decontaminating materials and the need for their frequent replacement. In addition, since it is difficult to determine the exact rate of deterioration of the decontaminating materials in the presence of the ammonia, users of such decontaminating materials must schedule their discard and replacement at intervals less than the shortest expected service life. To do otherwise would risk failure of a decontamination unit with the resultant loss of contaminated product when the excessive contaminant concentrations reaches the production chamber through the failed unit. Consequently, the current systems require that many if not most of the decontamination units must be discarded while they still have some degree of useful service life left, thus further increasing the expense of the system operations. This must be considered against the background that the market expects that manufacturing processes must have a continuous pure gas flow at high flow rate with consistent levels of purification and low cost of ownership. Therefore the more that a process deviates from these anticipated parameters, the less acceptable it is. The successful processes are those which have sufficiently high levels of purification to permit the maximum practical operating lives at reasonable cost.

While ammonia decontamination systems have been described that include multiple adsorbent beds or vessels that alternate in decontaminating and regenerative function, such systems suffer drawbacks in that they either a) require the periodic replacement of adsorbent, e.g., a getter alloy, and/or b) involve a regenerative process that relies on the administration of gas from outside the system to generate fresh adsorbent, e.g., alumina, from contaminant-saturated adsorbent. See, e.g., U.S. Pat. No. 5,833,738 (Carrea et al.).

Until the present invention, the above processes were limited by the need to add exogenous supplies of gas, for instance from cylinders, to the system. This required more handling and plumbing, which in turn exacted a toll on overall process efficiency.

If the supply of regenerant gas or fresh adsorbent could be supplied from within the system itself, it would simplify and enhance existing purification and gas delivery systems, thereby resulting in lower operating costs, which savings in turn could be passed on to the benefit of the consumer.

SUMMARY OF THE INVENTION

The invention herein is of an improved ammonia decontamination system which includes the capability of self-regeneration of the metal or metal oxide decontaminant/adsorbent. Regeneration of spent or contaminated adsorbent (highly oxidized) is accomplished by reducing the metal adsorbent to lesser oxidized (more reduced) states using hydrogen gas which is produced by cracking a fraction of the purified ammonia product, such that there is no need to supply large amounts of hydrogen from external sources. When there are at least two ammonia purifying reactors in parallel and at least one ammonia cracking reactor, the process is both self-contained and capable of continuous operation. This translates to reduced down time, less servicing and handling, increased safety and increased efficiency.

The process of the invention can be operated for long periods of time owing to the efficient self-regeneration of adsorbent using controlled amounts of regenerant gas evolved from the internal cracking of ammonia, according to the equation:

$$2NH_3 \rightarrow N_2 + 3H_2 \quad (1)$$

Nitrogen and hydrogen are thus produced, with hydrogen in the greater molar quantity. Hydrogen, a reducing agent, in effect reverses the oxidation of the metal or metal oxide adsorbent during ammonia purification, thereby converting the metal of the adsorbent to a reduced oxidation state for further ammonia purification.

The contaminated ammonia feed stream may be the initial input stream to the process, or it may be a stream which is returned for increased purification after having already been partially purified. In the first case, the feed stream to the purification system will be a stream of fresh (but not decontaminated) fluid $NH_3$, while in the second case the feed stream will usually be the discharge stream from a previous stage of the decontamination process, i.e., ammonia that has been partially decontaminated. The principal contaminants (such as oxygen, water vapor and carbon dioxide) which are removed from the ammonia are adsorbed/chemisorbed from a reaction with reduced metal/metal oxide adsorbent.

Adsorbents are selected from among many known in the art and standardly used in the decontamination of gases, e.g., reduced metals and metal oxides capable of further oxidation, and other catalysts that are stable in the presence of ammonia. Preferred for use in the invention is a reduced iron/manganese oxide that is effective for removal of water, oxygen, carbon dioxide and hydrocarbons.

The preferred system and process of the invention contemplates a plurality of beds having adsorbent for stripping ammonia of contaminants upon pass-through. These beds are interconnected and used on a rotating basis, so that while some beds are being run to decontaminate input ammonia and provide by-product hydrogen from ammonia cracking, others of the beds are being regenerated by passage therethrough of the by-product hydrogen under reducing conditions. By scheduled cycling of the various decontamination beds over run periods usually of several weeks, continual decontamination of ammonia can be obtained without the need for separate input of large quantities of regeneration hydrogen.

Thus, while all of the adsorbent beds may operate simultaneously in the decontamination mode, it is contemplated that not all will, and that those that are not at a given time operating for ammonia decontamination will be undergoing or have just undergone a regeneration of their adsorbent so as to be ready to resume decontamination operation as the adsorbents in the operating beds become spent or otherwise cease to function optimally or properly. Preferably, and to optimize and promote a more continuous purification, stand-by beds (regenerated or new) are activated as necessary while a corresponding bed is targeted for shutdown and regeneration. In this manner, at least one bed in the system is operative at any given time, i.e., in operative communication with an ammonia stream undergoing decontamination.

A small portion of purified ammonia is drawn off from the product stream from the purification bed and directed to a cracking reactor, in which it is decomposed to its component hydrogen and nitrogen gases, which are then directed to a second adsorbent bed, one which has been withdrawn from ammonia purification service for adsorbent regeneration. The hydrogen gas reduces the metal adsorbent to release the accumulated contaminant oxygen, water, hydrocarbons and/or carbon dioxide, which are entrained in the hydrogen gas stream and removed from the regenerating bed and vessel, thus regenerating the adsorbent. The nitrogen generated by ammonia cracking, although essentially inert, may assist in desorption (regeneration) through collisional effect with the contaminants.

Preferably the bed to be regenerated is externally heated, e.g., by a band heating element.

The method permits continuous removal of contaminants from a stream of ammonia to a contaminant content in the purified ammonia stream of not more than 100 ppb, preferably not more than 10-50 ppb, and more preferably not more than about 1 ppb.

The hydrogen gas, as noted, is generated by the decomposition of a portion of the purified ammonia product in a reactor separate from the purification beds/vessels but connected with them for fluid communication of the ammonia, hydrogen and nitrogen. Means for decomposing (cracking) ammonia into its component parts are known in the art, and may be accomplished by a variety of means and apparatuses, preferably those that employ heat in combination with a catalytic material. Conventional alternatives to the use of such thermal catalytic decomposition of ammonia into its constituents include plasma excitation, photoexcitation, electrolytic cracking, RF cracking, and microwave discharge.

In preferred embodiments, a transition metal, mixture of transition metals, or alloy or alloys derived therefrom are used as the cracking catalyst (as distinguished from adsorbent/chemisorbent catalyst). Examples of such materials include Ru, Fe, Mn, Ni, Pt, Pd, Re, Zr, Os, Ir, and Co and their alloys and oxides. The materials may be present in a specialized vessel or bed, e.g., a "reactor", in the form of a metal or metallic coating on a high surface area substrate. Preferred for purposes of the invention are Ru, Ni, and/or Re on an alumina substrate coating.

In various embodiments, the portion of ammonia product from one adsorbent bed diverted to decomposition for generation of hydrogen for use in regeneration of a companion bed will be from about 1%-50% by volume of the total ammonia purified that produced in the first bed, more preferably about 2%-30%, and still more preferably about 3%-10%. The regenerating bed is heated to about 200°-500° C., preferably 300°-400° C., for optimum hydrogen reduction regeneration of the oxidized adsorbent bed. The degree of regeneration obtained, and the conditions used, will depend on such variables as the nature of the metals or metal alloys in the adsorbent and the desired purity level of the ammonia to be obtained. The cracking rate (i.e., portion of diverted ammonia product which is cracked to hydrogen) may be up to 80%. Preferred for catalytic regeneration of the purification adsorbent is a 5%-10% cracking rate. This means that good decontamination of ammonia can be achieved under relatively mild operating conditions, with improved energy usage, reduced energy consumption and loss, and enhanced safety, as compared to high temperature processes of the prior art.

Optionally one can add extra nitrogen (from an outside source) to dilute the diverted portion of ammonia before cracking. This will allow use of less ammonia. The dilution must not, however, be so great that the volume of hydrogen resulting from the cracking is insufficient for regenerate of the second bed. It will be recognized that the limitation on degree of any such dilution will be related to the degree of cracking that occurs in the cracking reactor.

The hydrogen flow regenerates the adsorbent bed by reducing oxidized metal and desorbing the contaminants which accumulated on the catalyst during the bed's previous decontamination operation. The flow is controlled such that the bed is fully regenerated before, preferably several hours or days before, the operative bed or beds' decontamination capacity is reached. In this manner, when the operative bed(s) approach capacity for adequate decontamination, the contaminated ammonia fluid stream can within a short period, preferably seconds, be diverted to the regenerated bed and the further decontamination of ammonia proceed substantially without interruption.

Therefore, in one broad aspect, the invention involves a method of decontaminating fluid ammonia comprising contacting contaminated fluid ammonia with an adsorbent to transfer contaminants therein from the contaminated fluid ammonia to the adsorbent, thereby producing decontaminated fluid ammonia, and thereafter regenerating the adsorbent by reacting a portion of the decontaminated fluid ammonia to produce hydrogen gas and contacting the adsorbent with the hydrogen gas to remove transferred contaminants therefrom, the adsorbent thereafter being capable of contact with additional contaminated fluid ammonia for decontamination thereof.

In another embodiment, the invention involves a method as in the preceding paragraph wherein the adsorbent is disposed in a plurality of interconnected vessels, and preferable wherein operation of the method comprises alternatively using each such vessel for decontamination of the contaminated fluid ammonia and regeneration of the adsorbent.

In a further aspect the invention involves a purification system for decontaminating contaminated fluid ammonia comprising adsorbent for reducing the level of contaminants in the fluid ammonia when contacted therewith by absorption of the contaminants from the fluid ammonia onto the adsorbent; and regeneration means for periodic in situ regeneration of the adsorbent by removal of transferred contaminants therefrom by contact with of the adsorbent with the regeneration means, the regeneration means comprising hydrogen gas produced by decomposition of a portion of a fluid ammonia undergoing decontamination.

In yet another embodiment, the invention involves a purification system as in the preceding paragraph for decontaminating fluid ammonia comprising a plurality of vessels each having a body of the adsorbent disposed therein; a first vessel of the plurality having a first body of the adsorbent disposed therein, the first body capable of reducing a level of the contaminants in the fluid ammonia to a desired degree by contact therewith; a second vessel of the plurality having a second body of the adsorbent disposed therein, the second body of the adsorbent having deposited therein a sufficient quantity of the contaminants removed from contaminated ammonia to prevent the second body of the adsorbent from maintaining the desired degree of reduction of level of the contaminants in fluid ammonia by contact therewith; and the regeneration means comprising a reactor in communication with the first vessel and the second vessel for receiving a portion of decontaminated fluid ammonia discharged from the first vessel, decomposing at least a part of the portion of the decontaminated ammonia into hydrogen gas, and passing the hydrogen gas to the second vessel for removing a sufficient amount of the contaminants deposited therein to regenerate the adsorbent in the second vessel for reuse to decontaminate the fluid ammonia.

Other aspects and embodiments will be described below or will be evident from the description below.

DETAILED DESCRIPTION AND PREFERRED EMBODIMENTS

The invention is based on the continuous, self-contained purification of ammonia made possible by an integrated means for decomposing a fraction of the ammonia into its constituent gases hydrogen and nitrogen, with the hydrogen in turn being used to reduce and thereby regenerate adsorbent beds when needed. This allows, in preferred embodiments, for the alternating and continued use of ammonia decontamination vessels.

Figure 1:
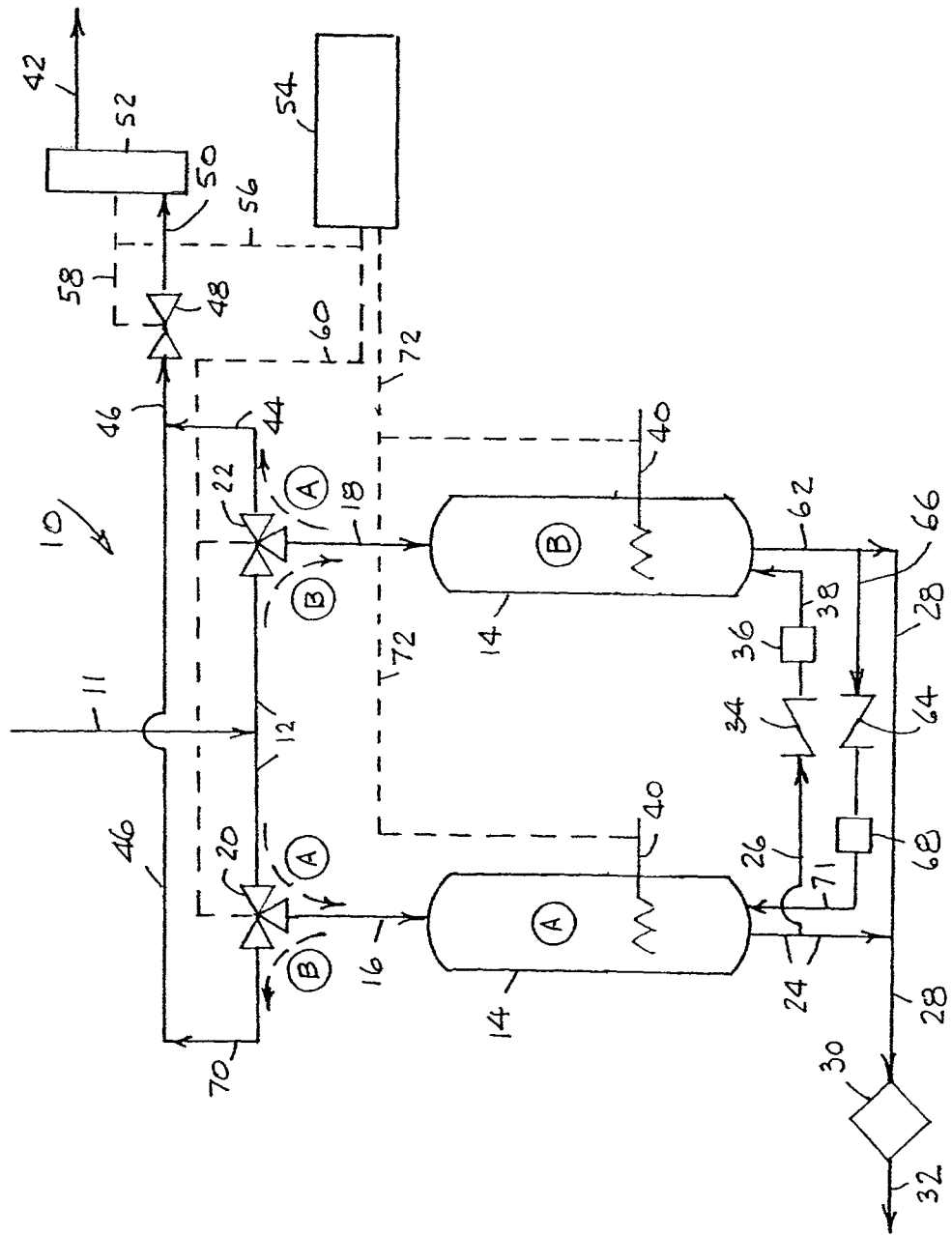
FIG. 1 is a schematic diagram of one embodiment of an ammonia decontamination system of the invention.

The invention is best understood by reference to FIG. 1. Contaminated ammonia is passed to the decontamination system 10 through line 11. It then passes into line 12 through which it can alternatively be passed to either of the vessels 14 (identified separately as A and B). For the following description it will be assumed that initially vessel A is the decontamination site and vessel B is the vessel which is undergoing regeneration. In this operating mode the contaminated fluid ammonia is passed through line 12 to three-way valve 20 through which it is diverted to line 16 leading to vessel A as indicated by the dashed arrow marked with the circled A. In vessel A the contaminated ammonia is decontaminated by passage through a reduced metal/metal oxide bed, as will be described below. Most of the decontaminated (purified) gaseous ammonia leaves vessel A through discharge line 24 from which it is passed through discharge line 28 and filter 30 and sent on through line 32 to a manufacturing process in which it will be used for cleaning, as will be described later.

A portion (1%-50%, more preferably 5%-10%) of the purified fluid ammonia is withdrawn from discharge line 24 through line 26 and passed through one-way valve 34 to cracking reactor 36, in which the ammonia is cracked into hydrogen and nitrogen according to the above mentioned Reaction 1. The product hydrogen and nitrogen then pass through line 38 to vessel B. The adsorbent bed in vessel B will be contaminated with those materials which it has removed from the fluid ammonia in a previous decontamination operation. The hydrogen and nitrogen ammonia decomposition products from the reactor 36 are fed upward through the adsorbent bed in vessel B, which is heated to the appropriate temperature by heating element 40. The flow of gaseous nitrogen and hydrogen chemically converts the contaminants into materials which are gaseous or which can be physically entrained in the moving gas stream. Some contaminant materials may already be in such entrainable form, so they are swept up into the gas stream without chemical reaction with the hydrogen or nitrogen. A very common reaction is the reaction of the hydrogen with metal oxides to reduce the metal oxides to metal or more reduced oxides, with the excess oxygen removed as product water vapor.

The gas stream with its entrained or absorbed materials exits at the top of the vessel B through line 18 and passes through three-way valve 22, which is aligned to direct the gas stream to vent 42 as indicated by the second dashed arrow labeled with the circled A. The discharged contaminated gas passes through line 44 into discharge line 46 and through control valve 48 to line 50 and metering device 52. Metering device 52 is preferably a rotameter or a mass flow controller and the flow rate obtained through the rotameter is passed to controller 54 through signal line 56. The control system 54 then operates valve 48 through signal lines 56 and 58 to control the off-gas flow rate from vessel B so that passage of the regenerating gas through vessel B will be at a rate sufficient to completely regenerate the adsorbent bed in vessel B during a time interval less than the time interval used by vessel A for decontamination of ammonia, preferably by several hours up to several days. This ensures that when the decontamination capacity of the adsorbent bed in vessel A is approached or reached, control device 54 can operate three-way valves 20 and 22 through signal line 60 to redirect the incoming contaminated fluid ammonia through line 12 to vessel B for ammonia decontamination in vessel B while then taking vessel A out of decontamination service for regeneration of its contaminated adsorbent bed.

Regeneration of the adsorbent bed in vessel A proceeds in the same manner as described above for vessel B. Three-way valve 22 is aligned as indicated by the dashed arrow marked with the circled B for passage of the stream of contaminated ammonia into vessel B. The main quantity of purified ammonia is discharged from vessel B through line 62 and passes to discharge line 28. An equivalent small portion of the purified ammonia is withdrawn from line 62 through line 66 and passed through one-way valve 64 to reactor 68 which converts the ammonia to hydrogen and nitrogen for use as purging/regenerating agents, and from which the gases are passed through line 71 to Vessel A. Vessel A is heated to the proper temperature for adsorbent decontamination by an equivalent heating element 40. The gases generated by the decomposition of ammonia pass through vessel A and remove the accumulated contaminants from the adsorbent bed in the vessel in the same manner as described above for Vessel B, after which the gases are discharged at the top of the vessel through line 16 and three-way valve 20, which is now aligned as indicated by the second dashed arrow labeled with the circled B. The purging gases pass into line 70 from which they pass to line 46 for eventual venting through line 42 as described previously.

It will be understood that alternate valving systems for vessels A and B which perform equivalent flow switching may also be used. For instance, instead of three-way valves 20 and 22 pairs of ball valves may be used to route the ammonia and gas streams. These valves can be opened gradually and simultaneously closed, to provide for the same operating flow streams as described above. Other valve configurations will be readily apparent to those skilled in the art.

Controller 54 may be a simple electrical system with timers controlling the signals to switch valves 20 and 22 and a circuit responsive to metering device 52 to adjust control valve 48 as appropriate, or it may be a microprocessor, with the control of valves 20, 22 and 48 being managed by software. Such systems are conventional and need not be described further here. Regardless of which type of system is used, it may also contain appropriate safety features, such as a limiting function and signaling capability through line 72 to turn off a heating element 40 if an operating or regenerating vessel A or B becomes overheated. Other features which can be included in the control system 54 include control or information features for various safety, operator information, or convenience purposes.

It has been found that a typical adsorbent bed can be operated for approximately 1-8 weeks (preferably 3-4 weeks) for decontamination of ammonia before the decontamination rate is reduced to an unacceptable level, depending on the grade of ammonia being used and flow rate. Similarly, it has been found that one can regenerate a spent adsorbent bed by using a relatively small draw-off stream (preferably approximately 5%-10% of the purified ammonia) from the operating vessel. The drawn-off ammonia is "cracked" and the gaseous products used as regenerant to regenerate a adsorbent bed in less than one week. Consequently it is easy to operate the present system on a cycle such that the two vessels are alternated as the decontamination and regeneration vessels at regular intervals. The operator is thus assured that there is a virtually continuous flow of purified ammonia from the system and that switching of the contaminated ammonia fluid stream is accomplished before the adsorbent bed in the decontamination vessel is completely spent. Since the three-way valves 20 and 22 normally operate to switch the incoming fluid stream between the routes of lines 12/16 and 12/18 in a short time interval, there is essentially no significant lapse in production of purified ammonia from the system.

Because adsorbents retain their efficacy for purification of contaminated ammonia over extended periods of time when they are regularly stripped of contaminants and regenerated, the system shown in FIG. 1 of this invention can be used to produce purified ammonia in good yield and high purity over a long service life, which may be several months up to approximately 3-5 years. In fact it has been found that ammonia decontamination in a vessel appears to be improved after regeneration, as indicated by a measurable decrease in residual contaminant content in the discharged purified ammonia, which suggests that there is a "conditioning" effect for the adsorbent produced by the regeneration.

It may also be desirable to use a small amount of nitrogen (either collected from the ammonia cracking or brought in from an outside source) to purge the regenerated adsorbent bed of residual hydrogen prior to restarting the flow of contaminated ammonia through the regenerated bed for purification.

The ammonia may be efficiently decomposed to hydrogen and nitrogen by several different processes, including but not limited to metal oxide catalysis, plasma excitation, photoexcitation, electrolytic cracking, RF (radio frequency radiation) cracking or microwave discharge. The preferred method is metal oxide catalysis, using transition metals, mixtures of transition metals, or alloys derived therefrom as the ammonia cracking catalyst. Examples of such metals include Ru, Fe, Mn, Ni, Pt, Pd, Re, Zr, Os, Ir, and Co and their alloys and oxides. The materials may be present in a specialized vessel or bed, e.g., a "reactor", in the form of a metal or metallic coating on a high surface area substrate. Preferred for purposes of the invention are Ru, Ni, and/or Re on an alumina substrate coating, and more preferably the use of a ruthenium/alumina catalyst as supplied by any of a variety of commercial suppliers (e.g., Engelhard or Johnson Mathey). As noted, In the preferred embodiment of the invention there is a bleed-off of about 3%-10% of the ammonia gas from the vessel 14 (A or B) to the reactor (respectively 36 or 68) for cracking. There, at conversion conditions of up to 80% cracking, preferably about 5-10% cracking, of the shunted ammonia, hydrogen is generated for adsorbent bed regeneration. Flow rates are anticipated to be between about 100 ml and 100 L per minute. The temperature of the hydrogen gas used in the regeneration is about 200°-500° C., preferably 300°-400° C.

Decontamination in the vessels 14 of the system 10 preferably uses an active high surface area reduced metal/metal oxide substrate for removal of gaseous contaminants, notably oxygen, carbon dioxide, hydrocarbons and water vapor, from an ammonia gas stream. Reduction of contaminant level is to a level $\leq 100$ ppb, preferably $\leq 10\text{-}50$ ppb, and most preferably $\leq 1$ ppb. (It is recognized that contaminant measuring equipment currently generally available may not yet be capable of measuring contaminant concentration as low as 10 ppb. However, for the purpose of this invention, it will be assumed that such equipment will be developed and will be available in due course. The availability, or lack thereof, of appropriate measuring equipment does not, however, alter the various levels of decontamination which are called for and can be achieved in the present invention.)

As noted above, many different metals and their oxides are useful in the present invention, as long as they have the requisite high surface area and maintain their structural stability (either alone, mixed or in combination with another metal oxide which has greater structural integrity in the present of the hydride gas stream). By "structural integrity" is meant that the metal oxide substrate can resist erosion or breakage during the course of several dozen heat regeneration-cooling cycles, and does not deteriorate by suffering reduction of surface area below about 100 $m^2/g$. This usually translates to a useful service life of between 3 and 5 years or several dozen heated-regeneration/cooling cycles.

For brevity herein, the example for description of ammonia decontamination will be that conducted using manganese oxides, which are the preferred oxides for the process. Manganese is known to form at least five oxides, which are, in descending order of oxidation state of manganese, $Mn_2O_7$, $MnO_2$, $Mn_2O_3$, $Mn_3O_4$ and MnO, followed by metallic $Mn^0$; see, generally, Greenwood et al., CHEMISTRY OF THE ELEMENTS (2nd edn: 1997) and Durrant et al., INTRODUCTION TO ADVANCED INORGANIC CHEMISTRY (2nd edn: 1970). It has been found that, starting with the highest oxidation state one must heat the oxides to progressively higher temperatures in the presence of a reducing agent to achieve reduction, ultimately requiring a temperature of about 1200° C. to reduce the oxides completely to metallic manganese. However, in the present invention it is not desirable to reduce all of the manganese oxides all the way to metallic manganese, since the structural networks composed primarily of the metal and the lower oxidation state oxides do not have sufficient surfaces areas to effectively decontaminate the hydride gases for reasonable lengths of service life. Consequently, in the present invention reduction is limited to that degree of reduction which results in a oxide (or usually in an oxide mix, since reduction does not proceed step-wise) substrate which contains areas or sites of reduced metal activity, and has adequate structural integrity and sufficient minimum surface area of at least about 100 $m^2/g$, preferably $\geq 200$ $m^2/g$, and more preferably in the range of 200-800 $m^2/g$. Fortunately, this limited degree of reduction also has the advantage that obtaining such reduction requires significantly lower reduction temperatures, such that good manganese oxide substrates can be obtained by heating usually to no more than about 500°-600° C., and in some cases to as low as 200°-400° C. The actual mixtures of manganese oxides (with reduced active metal sites) achieved by such reductive heatings are not normally known with certainty, since mixtures are not normally analyzed. The exact composition of the mixture is not significant, however, since it is the overall averaged substrate properties which are important.

It will be understood, of course, that the temperatures and temperature ranges, as well as the range of metal oxidation states and number of oxides, described above are specific to manganese. Other metallic elements will show similar properties, but the specific temperature ranges, metal oxidation state ranges, number of applicable oxides, and resultant mixture compositions, will differ for each element. In some cases, certain oxides (e.g., BaO) will have sufficient surface area and activity without reduction, but normally they will be in mixtures where other oxides do require reduction to produce an acceptable overall substrate product. Those skilled in the art will have no difficulty determining the appropriate values and operating conditions for any oxides of interest. (For the purpose of this invention, the term "metallic oxides" will include not only oxides of metallic elements but also the oxides of Group 1A and 2A elements, to the extent that they have the requisite structural and surface area properties.)

Several variations of structure are possible. For instance, there may be two or more metals used as the oxides. One desirable mixture is of manganese oxides and iron oxides in a ratio of about 80%-85% manganese oxides to 15%-20% iron oxides. The incorporation of the iron oxides into the overall oxide composition provides a "promoter effect," which permits the reduction to be conducted at lower reaction temperatures and still achieve reduced manganese oxides which have adequate structural integrity and surface area. Similar effects can be obtained by inclusion of oxides of elements such as calcium, cobalt, molybdenum, nickel, rhenium, titanium and tungsten. This permits production of decontaminant substrates in situations where to require higher temperatures could raise production problems.

Further, one can integrate oxides of one metal with oxides of another metal to get the decontaminant function of the first metal oxides in situations where they alone would not have sufficient structural strength to function in the present invention. By integrating them into or coating them onto a more structurally sound body of a second oxide group, their advantageous decontamination properties can be utilized notwithstanding their lack of independent structural integrity.

The high surface area metal oxide substrates can be used in a variety of different embodiments. For instance, one can simply pass the ammonia gas through a body consisting substantially or essentially of the substrate, either in a block form or as a body of granules, to the extent that the substrate is sufficiently porous by itself. The substrate can also be in the form of a body of comminuted fine powders. However, using such powders will cause a significant pressure drop in the gas stream, so it is preferred to used a powdered form of the substrate only in high gas pressure systems. It is thus possible to have different forms of the high surface area substrate for gas streams of different pressures, by using different particle sizes.

The high surface area metal oxide substrate can be in the form of one or more thin sheets. A single oxide (or oxide mixture) can be used, or oxides of two or more metals may be integrated into the substrates, along with the respective reduced metal active sites. One family of oxides can be used as the substrate with a second type of oxide as a coating over portions of the substrate surface or the surfaces of pores in the substrate. In either case the ammonia gas is flowed over, through and/or between the sheets as indicated by the arrows. Unlike prior art active coatings on inert substrates, the second oxide coating must not cover the entire surface of the active substrate, since that will prevent the active participation of the substrate itself in the decontamination process. It is preferred that the second oxide coating actually cover less than 50% of the substrate surface, and preferably less than 25%.

Typically the inlet ammonia gas for decontamination will have contaminant gas contents in the range of about 1-2 ppm, and the outlet, decontaminated hydride gases will have contaminant gas contents no greater than about 100 ppb, preferably no greater than 10 ppb, and most preferably no greater than 1 ppb. (As noted, limitations in current instrumentation may permit only determination that the actual contaminant level is less than the detection level of the instrument.)

Typically, one will be dealing with ammonia gas flow rates in the range of about 0.1-4000 standard liters of gas per minute (slm) and desired lifetimes per adsorbent charge of a vessel 14 in the range of 3-5 years. Operating temperatures of the gases may range from 0°-65° C. (32°-150° F.) and maximum inlet pressures to the canister 28 are commonly in the range of about 15-3600 psig ($10^3$-$2.5 \times 10^6$ kPa). The vessel size will be dependent upon the gas flow space velocity, the activity of the high surface area oxide substrate, and the amount and type of gaseous contaminants to be removed, since it is necessary to have sufficient residence time in the adsorbent bed in the vessel 14 to reduce the contaminant content of the ammonia gas to or below 100 ppb.

Figure 2:
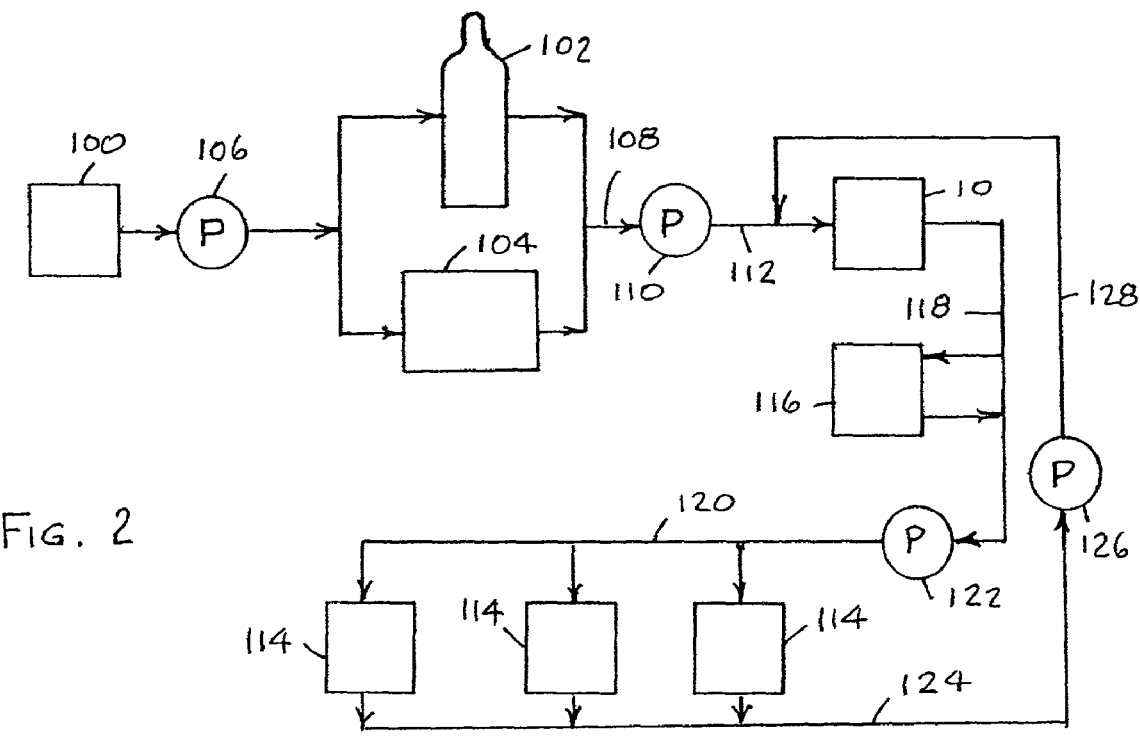
FIG. 2 is a block diagram illustrating the use of the present invention in a hydride gas decontaminating system for a gas- or vapor-deposition manufacturing process.

As illustrated in FIG. 2, it will be advantageous to use the process, material and equipment of the present invention in gas production facilities where original high purity ammonia gas is produced for shipment to the ultimate product manufacturers. Commonly, ammonia gas or liquid in bulk is produced by a gas supply company as at 100 and commonly then shipped and stored in familiar steel pressure cylinders 102 or delivered to bulk gas or liquid storage tanks 104 by tank truck, rail tank car or pipe line. Appropriate pumping facilities to 106 will be used where needed to move the ammonia. If desired some degree of ammonia liquid or gas decontamination may be effected by the manufacturer. It will be understood, however, that the volume of ammonia liquid or gas being generated originally by the manufacturer is usually such that it is usually not economically justified to try to reduce the contaminant content down to the final 100 ppb for delivery to the manufacturer's facility, except for very expensive product, e.g., "blue ammonia", as known in the art. Further, commonly some contaminants, especially oxygen or water vapor, are likely to reenter the gas from the ambient atmosphere during storage or while being transported to the customer's gas supply system. Also, decontamination to the final level for such a large volume of gas will take longer than is justified when filling large numbers of cylinders 102 or bulk-storage containers 104. However, the value of usage of the system of this invention is that the gas or liquid present in the cylinders 102 or bulk-storage containers 104 are available to the users' facilities with a reduced contaminant content, such that they can be conveyed through a user's gas feed lines 108 and 112 by pumping equipment 110 and pass to the decontamination system 10 of the present invention for the final reduction to the low contaminant content needed for the production processes 114, without requiring an intermediate decontaminant reduction step.

It is also advantageous in most gas delivery systems to include a particulate removal unit 116 either upstream, or preferably downstream of decontamination unit 10, to eliminate any particulate matter which has entered from a cylinder 102 or bulk-storage container 104 (or some other source). As noted above, one potential source is some of the ammonia gas itself. Such solids (particulate) removal units are conventional, and will be of a type made of ammonia-gas-resistant materials.

The purified gas is conveyed from the system 10 to the various manufacturing processes 114 as indicated by lines 118 and 120 using appropriate pumping facilities 122. In many cases the decontamination system 10 will be on the premises of the product manufacturer, and the lines 118 and 120 will be direct conduits from the decontamination system 10 to the manufacturing processes 114. On the other hand, if the decontamination system 10 is at some distance from one or more of the manufacturing processes 114, the lines 118 and 120 will include some transport medium, such as cylinders, carboys, or specially designed transport containers. In such cases, however, the transport medium itself must be cleaned to an equivalent level of decontamination as the purified gas to prevent the re-contamination of the gas.

Figure 3:
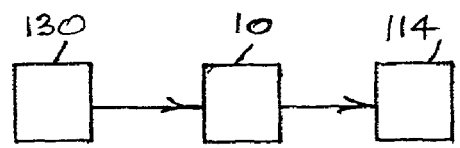
FIG. 3 is a block diagram illustrating a smaller scale "point of use" decontamination system of the present invention.

The preferred manner of use of the present invention is for "point of use" decontamination, e.g., having the purification unit mounted or integrated with a semi-conductor or LED manufacturing device. In this simpler system, as shown in FIG. 3, a source of the ammonia gas 130 (which may be a cylinder 102 or bulk-storage container 104, or some smaller or more localized source unit) delivers the gas to the local decontamination system 10 which is positioned immediately before the gas enters the manufacturing chamber 114.

It will be recognized that while the invention has been characterized in terms of use of ammonia gas for semiconductor and other electronic substrate manufacturing, it will be of similar value with respect to treatment of ammonia gas for deposition of component materials for any other type of high purity product where moisture content is detrimental to the product's production. This could include, for instance, production of high purity substrates or other types of materials for research purposes, production of optical fibers and optoelectronic devices (including lasers) and production of high purity materials that are to be used in extreme environments such as products for use in spacecraft or artificial satellites.

It will be evident from the above that there are numerous embodiments of this invention which, while not expressly stated above, are clearly within the scope and spirit of the invention. The above description is therefore intended to be exemplary only, and the actual scope of the invention is to be defined solely by the appended claims.

We claim:

1. A purification system for decontaminating contaminated fluid ammonia comprising:
    an adsorbent for producing decontaminated fluid ammonia, the adsorbent reducing the level of contaminants in said fluid ammonia to not more than about 100 ppb when contacted therewith by absorption of said contaminants from said fluid ammonia onto said adsorbent, wherein said adsorbent comprises at least one reduced metal, at least one reduced metal oxide, or a combination thereof, and said contaminants comprise oxygen; and
    a self-regeneration means for producing a gas mixture comprising hydrogen gas by decomposition of a portion of the decontaminated fluid ammonia and for delivering the gas mixture comprising hydrogen gas produced by decomposition of the portion of the decontaminated fluid ammonia to the adsorbent for periodic in situ chemical self-regeneration of the contaminated adsorbent by reduction of at least a portion of the contaminated adsorbent and removal of the contaminants therefrom by contact of said contaminated adsorbent with the gas mixture comprising hydrogen gas produced by decomposition of a portion of the purified ammonia product,
    wherein the gas mixture comprising hydrogen gas has the purity of less than 100 ppb.

2. A purification system as in claim 1 further comprising said fluid ammonia being a liquid.

3. A purification system as in claim 1 further comprising said fluid ammonia being a gas.

4. A purification system for decontaminating fluid ammonia comprising:
    an adsorbent for producing decontaminated fluid ammonia by reducing the level of contaminants in said fluid ammonia when contacted therewith by absorption of said contaminants from said fluid ammonia onto said adsorbent, wherein said adsorbent comprises at least one reduced metal, at least one reduced metal oxide or a combination thereof and said contaminants comprise oxygen;
    self-regeneration means for producing a gas mixture comprising hydrogen gas by decomposition of a portion of the decontaminated fluid ammonia and for delivering the gas mixture comprising hydrogen gas produced by decomposition of the portion of the decontaminated fluid ammonia to the adsorbent for periodic in situ chemical self-regeneration of the contaminated adsorbent by reduction of at least a portion of the contaminated adsorbent and removal of transferred contaminants therefrom by contact of said adsorbent with the gas mixture comprising hydrogen gas produced by decomposition of a portion of the purified ammonia product, wherein the gas mixture comprising hydrogen gas has the purity of less than 100 ppb,
    wherein the purification system includes:
    a plurality of vessels each having a body of said adsorbent disposed therein, wherein a first vessel of said plurality having a first body of said adsorbent disposed therein, said first body capable of reducing a level of said contaminants in said fluid ammonia to not more than 100 ppb by contact therewith, and further wherein a second vessel of said plurality having a second body of said adsorbent disposed therein, said second body of said adsorbent having deposited therein a sufficient quantity of said contaminants removed from contaminated ammonia to prevent said second body of said adsorbent from maintaining said desired degree of reduction of level of said contaminants in fluid ammonia by contact therewith; and
    said self-regeneration means comprising a reactor in communication with said first vessel and said second vessel for receiving a portion of decontaminated fluid ammonia discharged from said first vessel, decomposing at least a part of said portion of said decontaminated ammonia into hydrogen gas, and passing said hydrogen gas to said second vessel for removing a sufficient amount of said contaminants deposited therein to regenerate said adsorbent in said second vessel for reuse to decontaminate said fluid ammonia.

5. A purification system as in claim 4 wherein said first body of said adsorbent reduces said contaminant level of said ammonia to not more than 10 ppb.

6. A purification system as in claim 5 wherein said first body of said adsorbent reduces said contaminant level of said ammonia to not more than 1 ppb.

7. A purification system as in claim 4 further comprising control means for operation of said plurality of vessels and valve means for directing flow of said fluid ammonia to or away from each of said vessels, such that upon accumulation in said first body of adsorbent of a sufficient quantity of contaminants removed from said fluid ammonia to reduce capability of said first body of adsorbent to continue to reduce contaminant level in said fluid ammonia to said desired level, said control means activates said valve means for direction of said contaminated fluid ammonia to said second vessel and said second body of adsorbent and away from said first vessel and said first body of adsorbent.

8. A purification system as in claim 7 wherein said reactor following activation of said valve means receives fluid flow of ammonia from said second vessel for decomposition to said hydrogen and direction of said hydrogen to said first vessel for regeneration of said first body of adsorbent disposed therein.

9. A purification system as in claim 4 wherein said reactor converts up to about 80% of said portion of ammonia to hydrogen.

10. A purification system as in claim 9 wherein said reactor converts about 5%-10% of said portion of ammonia to hydrogen.

11. A purification system as in claim 4 wherein said reactor comprises apparatus for metal oxide catalysis, plasma excitation, photoexcitation, electrolytic cracking, RF cracking or microwave discharge.

12. A purification system as in claim 4 wherein adsorbent in said at least one vessel comprises at least one metal oxide that is capable of being reduced in the presence of hydrogen gas at temperatures between about 200° C. and 500° C.

13. An ammonia purification system, comprising:
an adsorbent, the adsorbent producing a purified ammonia stream having not more than about 100 ppb of contaminants by removing contaminants from a contaminated fluid ammonia stream after the adsorbent contacts the contaminated fluid ammonia stream, wherein said adsorbent comprises at least one reduced metal, at least one reduced metal oxide or a combination thereof and said contaminants comprise oxygen; and
an ammonia reactor for self-regeneration of the adsorbent, the ammonia reactor being in adjustable fluid communication with the adsorbent, the ammonia reactor producing a gas mixture comprising hydrogen gas, said gas mixture having not more than about 100 ppb of contaminants after contacting a portion of the purified ammonia stream, the gas mixture comprising hydrogen chemically self-regenerating at least a portion of the contaminated adsorbent by reduction after the hydrogen contacts the portion of the adsorbent.

14. The system of claim 13, wherein the adsorbent includes at least two separate bodies of adsorbent, and the ammonia reactor is adjustably configured to generate hydrogen from a portion of the purified ammonia stream produced from a first body of adsorbent, the hydrogen subsequently used to regenerate a second body of adsorbent.

15. The system of claim 14 further comprising a controller, the controller configuring flow of the contaminated ammonia through the first body of adsorbent when the second body of adsorbent is being regenerated.

16. The system as in claim 15 wherein the controller also configures flow of the portion of the purified ammonia stream from the first body of adsorbent to the ammonia reactor, and also configures flow of hydrogen produced from the ammonia reactor to the second body of adsorbent.

17. The system of claim 13, wherein regenerating the adsorbent includes removing transferred contaminants from the adsorbent.

18. The system of claim 13, wherein regenerating the adsorbent includes reducing oxidized metal.

19. The system of claim 13, wherein the portion of the purified ammonia stream is between about 1% to about 50% of the purified ammonia stream.

20. The system of claim 13, wherein the reactor is configured to perform at least one of metal oxide catalysis, plasma excitation, photoexcitation, electrolytic cracking, RF cracking, and microwave discharge.

21. The system of claim 13, wherein a portion of the adsorbent comprises at least one metal oxide capable of being reduced in the presence of hydrogen at temperatures between about 200° C. and about 500° C.

22. The system of claim 13, wherein the purified ammonia stream contains no more than about 100 parts per billion of a particular contaminant.

23. A purification system for decontaminating contaminated fluid ammonia, comprising:
an adsorbent for producing decontaminated fluid ammonia, the adsorbent reducing the level of contaminants in said fluid ammonia to not more than about 100 ppb when contacted therewith by absorption of said contaminants from said fluid ammonia onto said adsorbent and thereby oxidizing at least a portion of said adsorbent, wherein said adsorbent comprises at least one reduced metal, at least one reduced metal oxide, or a combination thereof, and said contaminants comprise oxygen; and
self-regeneration means for producing a gas mixture comprising hydrogen gas by decomposition of a portion of the decontaminated fluid ammonia and for delivering the hydrogen gas produced by decomposition of the portion of the decontaminated fluid ammonia to the adsorbent for periodic in situ chemical self-regeneration of the oxidized adsorbent by reduction of at least a portion of the oxidized adsorbent to its reduced state and removal of transferred contaminants therefrom by contact of said the oxidized adsorbent with the gas mixture comprising hydrogen gas produced by decomposition of a portion of the purified ammonia product,
wherein the gas mixture comprising hydrogen gas has the purity of less than 100 ppb.

* * * * *